Mar. 6, 1923.
H. S. CEDERHOLM
1,447,532
GAS IGNITER
Filed Mar. 3, 1921
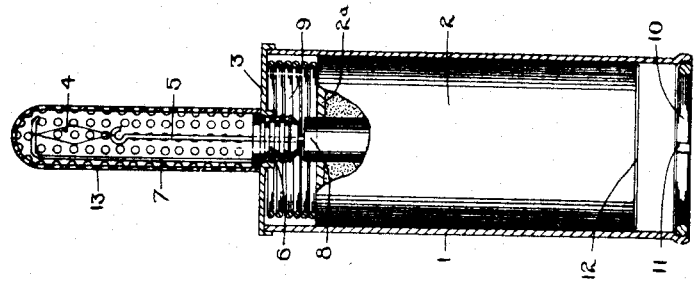
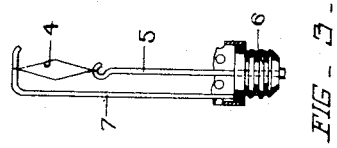
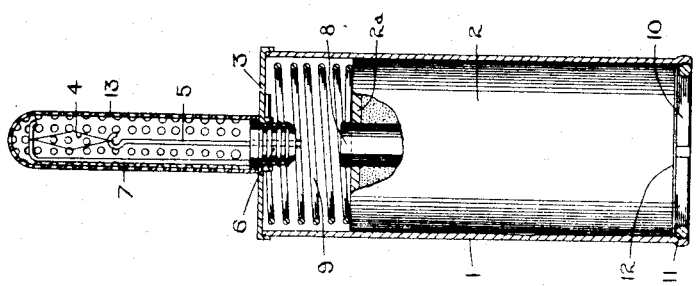
Inventor
H. S. Cederholm,
By Market Clark
Attys.

Patented Mar. 6, 1923.

1,447,532

UNITED STATES PATENT OFFICE.

HALFORD SIGFRID CEDERHOLM, OF WELLINGTON, NEW ZEALAND, ASSIGNOR OF ONE-HALF TO ELIAS JOS. HYAMS, OF WELLINGTON, NEW ZEALAND.

GAS IGNITER.

Application filed March 3, 1921. Serial No. 449,354.

*To all whom it may concern:*

Be it known that I, HALFORD SIGFRID CEDERHOLM, a citizen of the Dominion of New Zealand, residing at 6–8 Manners Street, Wellington, in the Provincial District of Wellington, a subject of the King of Great Britain and Ireland, have invented certain new and useful Improvements in Gas Igniters, of which the following is a specification.

This invention relates to that class of gas igniter which has a fine platinum wire or wires supported by wires one of which is insulated and passes into a casing containing a dry electric battery, the other of said supporting wires being connected electrically to the removable cap of the casing, the bottom of which is perforated, in order to permit of the battery being pushed in the casing to complete an electric circuit.

The present invention provides improvements which simplify the construction of igniters of this class thereby reducing the cost of the latter's production and enabling fresh batteries to be placed in the casing by unskilled persons.

An igniter according to the invention has the casing permanently closed at the upper end and open at the lower end. The inside of the latter has formed therein a circular groove to take an open spring ring which retains the battery in the casing. One of the supporting wires for the platinum wire or wires passes centrally through insulation held in a ferrule screwing into the closed end of the casing and into which said wire projects. The other of said supporting wires is electrically connected to the ferrule.

The terminal on the battery is kept normally separated from the lower end of the supporting wire entering the casing by means of a spiral spring placed loosely in the casing between the battery and the casing top.

The shell of the battery, and the casing are formed of metal to serve as conductors of electricity and make contact with each other.

The invention will be more particularly described with reference to the accompanying drawing in which:—

Figure 1 is a sectional elevation of the igniter when not in use.

Figure 2 is a sectional elevation of the igniter with the battery pushed into the casing to complete the electric circuit, and Figure 3 illustrates the platinum wires and their supports.

The casing 1 and the shell of the battery 2 are formed of metal suitable for conducting electricity, said casing being closed at one end by the permanently fixed top 3 and being open at the lower end.

The platinum wires 4 are arranged in the bow shape to allow for contraction and expansion, and thus prevent breakage of the wires under the high range of temperature to which they are subjected. At their lower ends the wires 4 are electrically connected to a supporting wire 5 which passes centrally through and is insulated from the metal ferrule 6 which screws into the fixed top 3. The wire 5 projects below the ferrule 6 into the casing 1.

The upper ends of the wires 4 are electrically connected to the supporting wire 7 which in turn is electrically connected to the ferrule 6.

The battery 2 has a terminal 8 on its upper end said terminal being kept normally forced away from and out of contact with the lower end of the wire 5 by the spiral spring 9 placed between the battery 2 and top 3 without being secured to either or to the casing.

The top of the battery 2 on which the spring rests is sealed by non conducting material 2ª.

The battery 2 is prevented from leaving the casing 1 by the open wire ring 10 sprung into the circular groove 11 around the inside of the lower end of the casing.

A disc 12 of suitable material is preferably placed between the ring 10 and the battery 2 mainly for the purpose of improving the appearance of the lower end of the device. Instructions or other printed matter can be placed on the exposed side of the disc.

The wires 4, 5 and 7 are enclosed in a perforated cover 13 attached to the ferrule 6.

When the battery 2 is pushed into the casing 1 as far as it will go the terminal 8 makes contact with the lower end of the wire 5 and closes the electric circuit, the current passing through the battery terminal 8, wires 5, 4 and 7, ferrule 6, top 3, casing 1 and shell of the battery, back into the latter.

As the top of the battery on which the spring 9 rests is sealed with non conducting material and the spring 9 is of such a diameter that it cannot touch the terminal 8, a short circuit is prevented from occurring between the top 3 and the terminal 8 through the spring 9.

By leaving the spring loose or unattached to any part which is not done in igniters of this class as at present used, a fresh battery can be placed in position and the igniter recharged by persons unskilled in the use of tools.

The wires 4 are heated only when the electric circuit is closed and if then exposed to escaping gas, cause instantaneous ignition of the latter.

What I do claim and desire to obtain by Letters Patent of the United States is:—

1. A gas igniter comprising a casing having a permanently closed upper end and an open lower end provided with a groove, incandescible wires electrically connected to supporting wires one of which projects and is insulated from said casing, while the other of said supporting wires is electrically connected with said casing; a battery making electrical contact with and slidable in said casing, having a terminal kept normally separated from the lower end of said insulated supporting wire, by a spring insulated from the terminal of said battery; and a ring sprung into the groove in the casing below the battery for retaining the latter in the casing substantially as described and illustrated.

2. In a gas igniter of the kind described, a casing having a permanently closed upper end, supporting means carried by said casing adapted to support fine platinum wires, said casing having an open lower end provided with a groove and an open ring adapted to be sprung into said groove for maintaining an electric battery in position in the casing.

3. In a gas igniter, a casing having an open end, an incandescible member carried by the opposite end of the casing, a battery slidably mounted in the casing, means engageable upon the inward projection of the battery to complete the circuit to the incandescible member, means normally retaining the battery in non-circuit closing position, said battery being removable through the open end of the casing, and a split ring removably fitted in the open end of the casing preventing displacement of the battery therefrom.

In testimony whereof he has affixed his signature in presence of two witnesses.

HALFORD SIGFRID CEDERHOLM.

Witnesses:
ERNEST WILFRED BOYCE CAREY,
RUBY MYRTLE BROWNE.